US008110114B2

(12) United States Patent
Keenan

(10) Patent No.: US 8,110,114 B2
(45) Date of Patent: Feb. 7, 2012

(54) MULTIPLE FILTER CONTROLLER AND METHOD OF USE

(76) Inventor: Andrew D. Keenan, Southwick, MA (US)

( * ) Notice: Subject to any disclaimer, the term of this patent is extended or adjusted under 35 U.S.C. 154(b) by 553 days.

(21) Appl. No.: 12/332,432

(22) Filed: Dec. 11, 2008

(65) Prior Publication Data

US 2009/0095689 A1 Apr. 16, 2009

Related U.S. Application Data

(62) Division of application No. 10/907,260, filed on Mar. 25, 2005, now Pat. No. 7,481,919.

(60) Provisional application No. 60/556,285, filed on Mar. 26, 2004.

(51) Int. Cl.
*B01D 37/04* (2006.01)

(52) U.S. Cl. ........................................ 210/741; 210/791

(58) Field of Classification Search .................. 210/741, 210/767, 791

See application file for complete search history.

(56) References Cited

U.S. PATENT DOCUMENTS

| | | | | |
|---|---|---|---|---|
| 3,979,292 | A | 9/1976 | Kuhn | |
| 3,992,296 | A | 11/1976 | Nobuta | |
| 4,423,751 | A | 1/1984 | Roettgen | |
| 4,515,690 | A | 5/1985 | Yasuhara | |
| 5,149,433 | A | 9/1992 | Lien | |
| 5,595,138 | A | 1/1997 | Claret | |
| 5,858,224 | A | 1/1999 | Schwandt et al. | |
| 5,928,523 | A * | 7/1999 | Hobrecht et al. | 210/767 |
| 6,289,726 | B1 | 9/2001 | Ferris et al. | |
| 6,474,289 | B1 | 11/2002 | Lilly et al. | |
| 6,485,636 | B1 | 11/2002 | Moss | |
| 6,527,947 | B1 | 3/2003 | Channing et al. | |
| 6,569,320 | B1 | 5/2003 | Bedi et al. | |
| 6,672,147 | B1 | 1/2004 | Mazet | |

FOREIGN PATENT DOCUMENTS

| | | |
|---|---|---|
| GB | 2 333 244 | 7/1999 |
| JP | 09013938 A | 1/1997 |

* cited by examiner

*Primary Examiner* — Terry Cecil

(74) *Attorney, Agent, or Firm* — Doherty, Wallace, Pillsbury & Murphy, P.C.; Deborah Basile; Karen Chadwell

(57) ABSTRACT

A method for maintaining an efficiently working fuel system comprising: passing the fuel through a first filter of a multiple filter controller; monitoring a level of pressure established within the multiple filter controller as the fuel passes through the first filter, wherein monitoring comprises providing a pressure gage; detecting when the level of pressure has reached a predetermined level, wherein such detecting comprises providing a vacuum switch; redirecting the fuel from the first filter to a second filter when the predetermined level of pressure has been detected, wherein redirecting comprises manipulating an inlet valve of the multiple filter controller such that the inlet valve stops the flow of the fluid to the first filter and redirects the flow of the fluid to a second filter; and repairing or removing the first filter from the fuel system while the fuel is simultaneously flowing through the second filter.

5 Claims, 5 Drawing Sheets

PRIOR ART

MULTIPLE FILTER CONTROLLER AND METHOD OF USE

CROSS REFERENCE TO RELATED APPLICATIONS

This application is a divisional application of U.S. patent application Ser. No. 10/907,260 filed on Mar. 25, 2005, now U.S. Pat. No. 7,481,919, which claims the benefit of U.S. Provisional Application No. 60/556,285 filed on Mar. 26, 2004.

BACKGROUND OF THE INVENTION

1. Field of the Invention

The invention relates generally to a multiple filter controller and to a system incorporating the multiple filter controller. More specifically, the invention relates to a multiple filter controller, wherein the multiple filter controller comprises at least two filters in-line with a common inlet valve, a common outlet valve, and a throughput system, wherein the multiple filter controller can detect a faulty filter and can alert an operator of the need to repair or replace the faulty filter with a workable filter.

2. Background of the Invention

During normal use, filters often clog, restrict, tear, or otherwise undergo physical alterations such that the filters fail to optimally perform. Such alterations can create obvious problems whenever a system's successful operation depends on the continuous working performance of a filter.

Nowhere is the need for a filter's continuous optimal performance more evident than where a filter is responsible for the continued operation of an engine, such as an internal combustion engine. For example, fluids used in conjunction with an internal combustion engine, such as engine lubricating oil, transmission fluid, engine coolant, and engine fuel, often require continuous filtering so as to prevent contaminants in the fluid from depositing on and adversely affecting components of the engine and related systems. On internal combustion engines, which are operated continuously or near-continuously for long periods of time, such as diesel engines used to generate electrical power and diesel engines in trucks, trailers, recreational vehicles, and boats, the large quantity of fluid passing through the filter, in combination with partially contaminated fluids such as lower quality diesel fuel, result in operational difficulties and/or unexpected engine shut-downs due to premature filter plugging.

Referring to FIG. 1, a conventional diesel fuel system comprises a fuel tank 1 in-line with a primary filter 2, wherein primary filter 2 is in-line with a fuel pump 3. A secondary filter 4 connects fuel pump 3 with injector pump 5, wherein injector pump 5 comprises injection nozzles that send the fuel from injector pump 5 into an engine. During normal use, fuel storage tank 1 collects dirt, water, varnishes, rust, and bacteria. The increased level of contaminants in tank 1 cause primary fuel filter 2 to clog at a much faster rate than if fuel storage tank 1 did not collect such debris. As the clog prevents the fuel from reaching the engine, the engine ultimately shuts down. However, prior to shutdown, engine driven fuel pump 3 will naturally increase its vacuum to draw more fuel across primary filter 2. Because of this increase in vacuum, any loose hose clamps or poor connections will allow air to enter the fuel system, wherein such excess air reduces the overall efficiency of the system.

Accordingly, it is important to have a device comprising multiple filters capable of continuous operation such that a backup filter can quickly and easily replace a malfunctioning filter without the need to shut down the entire system. However, in many cases changing the malfunctioning filter can result in significant problems in priming and bleeding the system, which results in significant leakage of the fluid into the environment. Therefore, what is needed is a device comprising a backup filter that can be activated without the need to first remove or disassemble the now malfunctioning filter.

SUMMARY OF THE INVENTION

The problems discussed above are eliminated or greatly reduced by a multiple filter controller designed to allow a second in-line primary filter to be installed in a system that allows an operator to select it if the first primary in-line filter starts to clog or otherwise malfunction. A built in pressure gage and vacuum switch allow for easy monitoring of the in-line filter, and a remote annunciator panel can alert an operator if the filter is malfunctioning. This advance warning allows the multiple filter controller to make a simple task of switching to another in-line filter without a simultaneous shutdown of the engine. An operator can then deal with the malfunctioning filter, changing it if needed or draining the contaminants out of the offline filter. The multiple filter controller may also comprise a boost pump that enhances system bleeding and servicing. A fuel bleed port is incorporated into the multiple filter controller to allow filter servicing and system bleeding as needed.

DETAILED DESCRIPTION OF THE INVENTION

Figure 1:
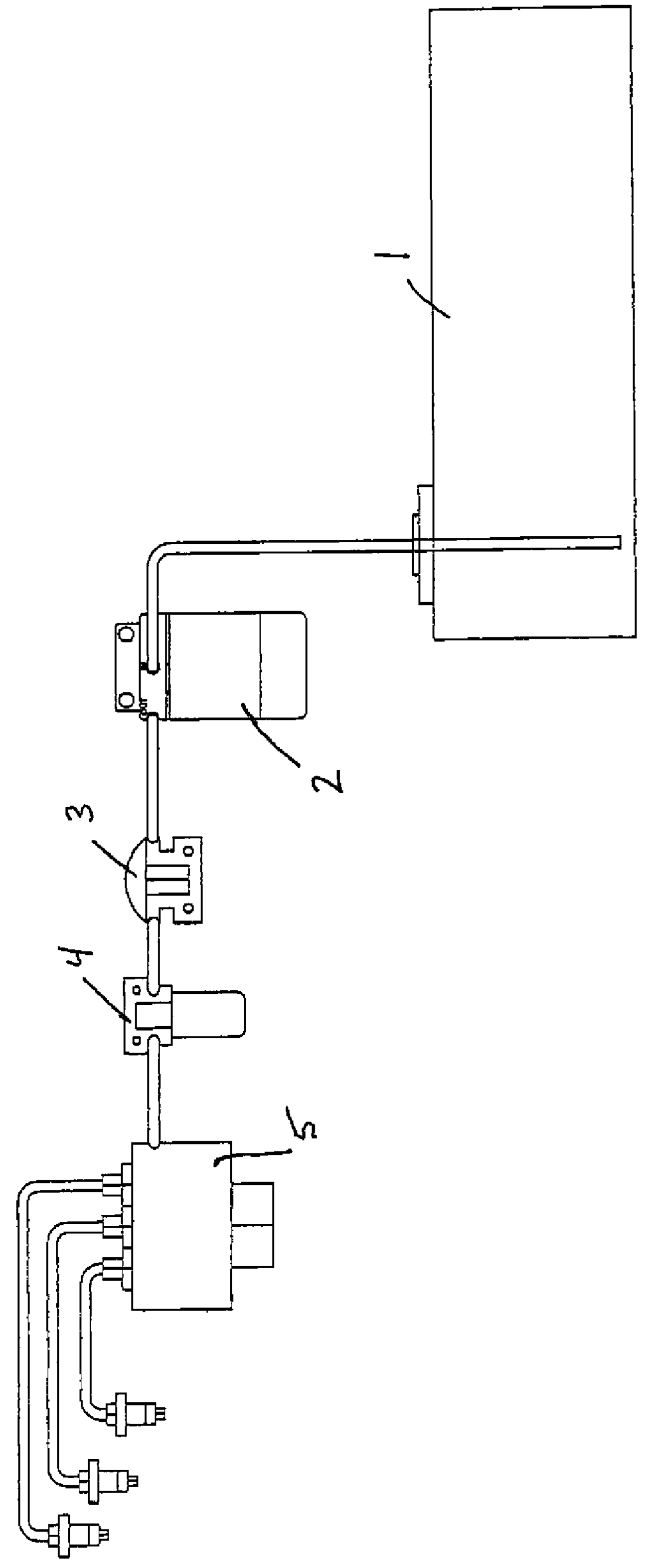
FIG. 1 is an illustration depicting a conventional fuel system.

Disclosed herein is a multiple filter controller comprising at least two filters, wherein the multiple filter controller is capable of detecting which filter(s) is no longer properly performing, and of switching operation from the malfunctioning filter(s) to a fresh, functioning filter(s). The multiple filter controller can either automatically exchange one or more malfunctioning filters with a replacement filter(s) and/or can alert an operator to the desirability of changing the malfunctioning filter(s), upon notification of which, an operator may manually redirect the flow of fluid from the malfunctioning filter(s) to a properly functioning filter(s).

In an exemplary embodiment, the multiple filter controller comprises a first filter in fluid communication with a fluid source, and a second filter in fluid communication with the same or a different fluid source. An inlet valve determines the directional inflow of the fluid through the multiple filter controller, such that the inlet valve directs the fluid to either the first filter and/or to the second filter. An outlet valve controls the directional outflow of fluid through the multiple filter controller, such that the outlet valve directs the fluid either from the first filter and/or from the second filter into the remaining portions of the multiple filter controller. Although the types of fluids which can be fed through the multiple filter controller can vary widely, and is ultimately dependent upon the specific application of the multiple filter controller, a preferred fluid comprises fuel, wherein diesel fuel is particularly preferred.

In an exemplary embodiment, the remaining portions of the multiple filter controller comprises a vacuum switch which can alert an operator if a filter is malfunctioning, as indicated by a build up of pressure within the multiple filter controller that exceeds a predetermined maximum pressure value. The multiple filter controller may also comprise a pressure gage, whereby an operator can readily visualize the pressure contained within the device at any desired moment. Once the pressure exceeds a predetermined level, or is under a predetermined level, the vacuum switch can electronically communicate with either a local annunciator and/or with a remote annunciator. The annunciator(s), by at least one of visual, auditory, or vibrational means, can alert an operator that a change of filters is recommended. Additionally or alternatively, the vacuum switch can trigger the inlet and outlet valves to automatically switch filters without the need for human interference. While the system of which the multiple filter controller forms a part continues to operate, the filters may be switched from the malfunctioning filter to a properly functioning filter in a safe manner whereby spillage of remnant fluids may be decreased.

It is contemplated herein that, although the present disclosure identifies only two filters in the multiple filter controller, any number of filters may be incorporated into the multiple filter controller in a manner that will be obvious to one of ordinary skill in the art after a full reading of the present disclosure. Additionally, the filters of the multiple filter controller may comprise a wide variety of filters, such as, for example, filters of a conventional, spin-on canister-type. Also, the present invention contemplates the use of any filter media with a finite life, or which is not regenerative. For example, the present invention includes cartridge filters. Additionally, each filter forming the multiple filter controller disclosed herein may comprise the same, similar, or different type of filter as the other filter(s) that is part of the multiple filter controller.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated multiple filter controller, and such further applications of the principles of the invention as illustrated therein being contemplated as would normally occur to one skilled in the art to which the invention relates.

Figure 2:
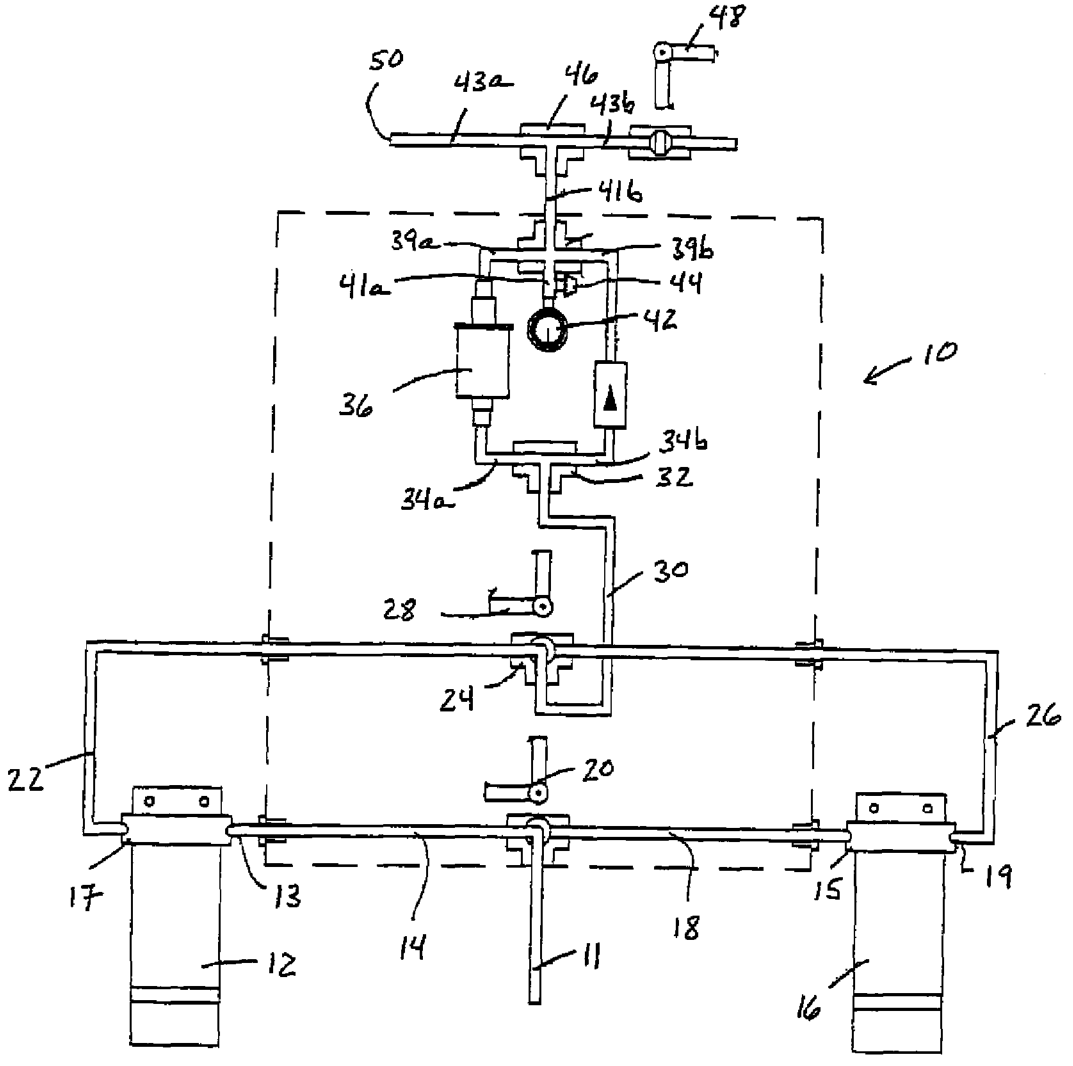
FIG. 2 is an illustration depicting an exemplary multiple filter controller.

FIG. 2 depicts an exemplary multiple filter controller 10. Here, multiple filter controller 10 comprises an inlet pipe 11 that leads to a conduit 14 and to a conduit 18 via an inlet valve 20. Conduit 14 leads to an inlet port 13 of a filter 12, and conduit 18 leads to an inlet port 15 of a filter 16.

Inlet valve 20, either by automatic means or by manual means, can open or close conduits 14 and 18, thereby governing which of filters 12 and 16 is to be utilized for a particular operation. That is, inlet valve 20 may be positioned to allow the fluid to exclusively enter either filter 12 or filter 16. In an alternative embodiment, inlet valve 20 may be positioned to allow fluid to enter both filter 12 and filter 16, such as when, for example, neither filters are working optimally, or, for example, to slowly wean filter 12 from use or during the inauguration of filter 16 into use.

Additionally, multiple filter controller 10 comprises a conduit 22 that connects an outlet port 17 of filter 12 to a manifold 24. Similarly, multiple filter controller 10 comprises a conduit 26 that connects an outlet port 19 of filter 16 to manifold 24. Manifold 24 comprises an outlet valve 28, wherein outlet valve 28 is positioned to direct, either automatically or by manual means, the flow of fluid from at least one of conduits 22 and 26. That is, outlet valve 28 may either open conduit 22 to allow the flow of fluid from filter 12 while simultaneously closing conduit 26 to prevent the flow of fluid from filter 16, or outlet valve 28 may open conduit 26 to allow the flow of fluid from filter 16 while simultaneously closing conduit 22 to prevent the flow of fluid from filter 12. Additionally, outlet valve 28 may allow access of the fluid out from both conduits 22 and 26. It is noted that the term "fluids", as used herein and throughout, may comprise any gaseous fluids or liquid fluids relevant to a particular use of the multiple filter controller. For example, where the multiple filter controller is to be used on a boat or on a recreational vehicle as part of the fuel system, an exemplary fluid comprises diesel fuel.

A conduit 30, which conducts the fluid from conduits 22 and 26, extends from manifold 24 to a manifold 32. At manifold 32, a conduit 34 is in communication with conduit 30, wherein conduit 34 comprises conduits 34*a* and 34*b*. Conduit 34*a* leads to a boost pump 36 and conduit 34*b* leads to a check valve 38. At a manifold 40 a conduit 39 comprises a conduit 39*a* and a conduit 39*b*, wherein conduit 39*a* is in communication with boost pump 36 and joins conduit 39*b*, and wherein conduit 39*b* is in communication with check valve 38 and joins conduit 39*a*. Boost pump 36 is preferably used to suction the fluid from its originating source, e.g., to suction fuel from a fuel tank, and feed the fuel through filters 12 and 16. Additionally, boost pump 36 may be used to assist in bleeding multiple filter controller 10 when used in conjunction with a bleed valve 48. Such bleeding is particularly desirable when, for example, an operator is replacing or fixing filter 12. Check valve 38 serves to prevent the backflow of fluid. That is, once the fluid passes through check valve 38 and into conduit 39*b*, check valve 38 prevents the fluid from flowing back through check valve 38 and into conduit 34.

A conduit 41 branching into conduit 41*a* and conduit 41*b* is joined to conduit 39 at manifold 40. A terminal end of conduit 41 is connected to a pressure gage 42, wherein pressure gage 42 indicates the pressure contained in multiple filter controller 10. Additionally, a vacuum switch 44, which is in electrical communication with an annunciator (not shown), is engaged with conduit 41*a*. Once the pressure contained in multiple filter controller 10 exceeds a predetermined pressure level, or is below a predetermined pressure level, vacuum switch 44 sends an electrical signal to the annunciators to alert an operator. Alternatively, or additionally, vacuum switch 44 or another electrical connector, may electrically signal inlet valve 20 and outlet valve 28 to reorient their respective positions such that the fluid no longer enters and exits the malfunctioning filter, but rather, enters and exits a properly functioning filter.

Conduit 41*b* extends upwardly to a manifold 46 where conduit 41*b* joins conduit 43. Conduit 43 comprises conduits 43*a* and 43*b*. In fluid communication with conduit 43*b* is bleed valve 48, wherein bleed valve 48 allows excess air to be removed from multiple filter controller 10. Conduit 43*a* terminates in an outlet 50.

It is herein noted that either one of boost pump 36 and check valve 38 are optional. Accordingly, in an exemplary embodiment, a single conduit may extend from manifold 24 to manifold 40, whereby the fluid simply moves through at least one of conduits 22 and 26 and feeds into the single conduit wherein the single conduit leads the fluid to conduit 41.

Although FIG. 2 depicts only two filters and the filters' respective conduits which link the filters to outlet 50, it is contemplated herein that the multiple filter controller may comprise more than two filters, wherein the number of filters is determined by the operational requirements of the multiple filter controller. Where additional filters are used, each filter can be connected to outlet 50 in a similar manner as has been previously described with reference to FIG. 2. However, additional conduits would be utilized to link the respective filter to the valves and manifolds depicted in FIG. 2. Also, valves 20 and 28 would be adapted to shut on and off access to any excess filters, i.e., filters that are not currently being utilized during the operation of the multiple filter controller.

Multiple filter controller 10 is preferably designed to allow fluids to flow through at least one filter and through the various conduits in-line with the respective filter(s). As the filter(s) that is being used during the operation of the multiple filter controller becomes faulty, such as, when the filter becomes clogged with debris, pressure begins to build-up within the multiple filter controller. Once the pressure reaches a preset magnitude, the multiple filter controller switches from the faulty filter(s) to a functional filter. The multiple filter controller can either automatically switch filters, or an operator can manually adjust valves 20 and 28 to close off the respective conduits of the faulty filter, and to open the conduits of the non-faulty filter.

For example, referring to FIG. 2, valves 20 and 28 may initially be set to allow a flow of fluid through filter 12. Should filter 12 clog or otherwise be unable to allow sufficient passage of fluid through filter 12 into conduit 22, pressure resulting from an external pump's force will either extend over a maximum preset threshold pressure or fall below a minimum preset threshold pressure, whereby vacuum switch 44 will signal to a local annunciator and/or a remote annunciator that filter 12 is in need of repair or replacement. The local annunciator is preferably disposed on a surface of a housing, wherein the housing contains the various conduits and valves of the multiple filter controller, and which is represented as a dashed line in FIG. 2. In an exemplary embodiment, the local annunciator may comprise a light indicator to indicate that boost pump 36 is on and another light indicator to indicate when the filter in use should ideally be changed. The remote annunciator, as described more fully below in reference to FIG. 3, may also comprise the above-described light indicators, but may be placed in a more convenient place of visibility to an operator, such as on the steering panel of a vehicle. Additionally, or alternatively, the local and remote annunciators may also comprise auditory indicators to perform the same function as the light indicators.

Once an operator is notified that the primary filter is in need of repair or replacement, the operator can switch valves 20 and 28 such that fluid can no longer pass through filter 12, but rather the fluid passes through filter 16. While filter 16 is operating, an operator can fix or replace filter 12.

Still referring to FIG. 2, boost pump 36 may be used to suction fluid from its originating source and feed the fluid through filters 12 and 16. Additionally, boost pump 36 may be used to assist in bleeding the multiple filter controller such as when, for example, either one or both of filters 12 and 16 is not operating.

Figure 3:
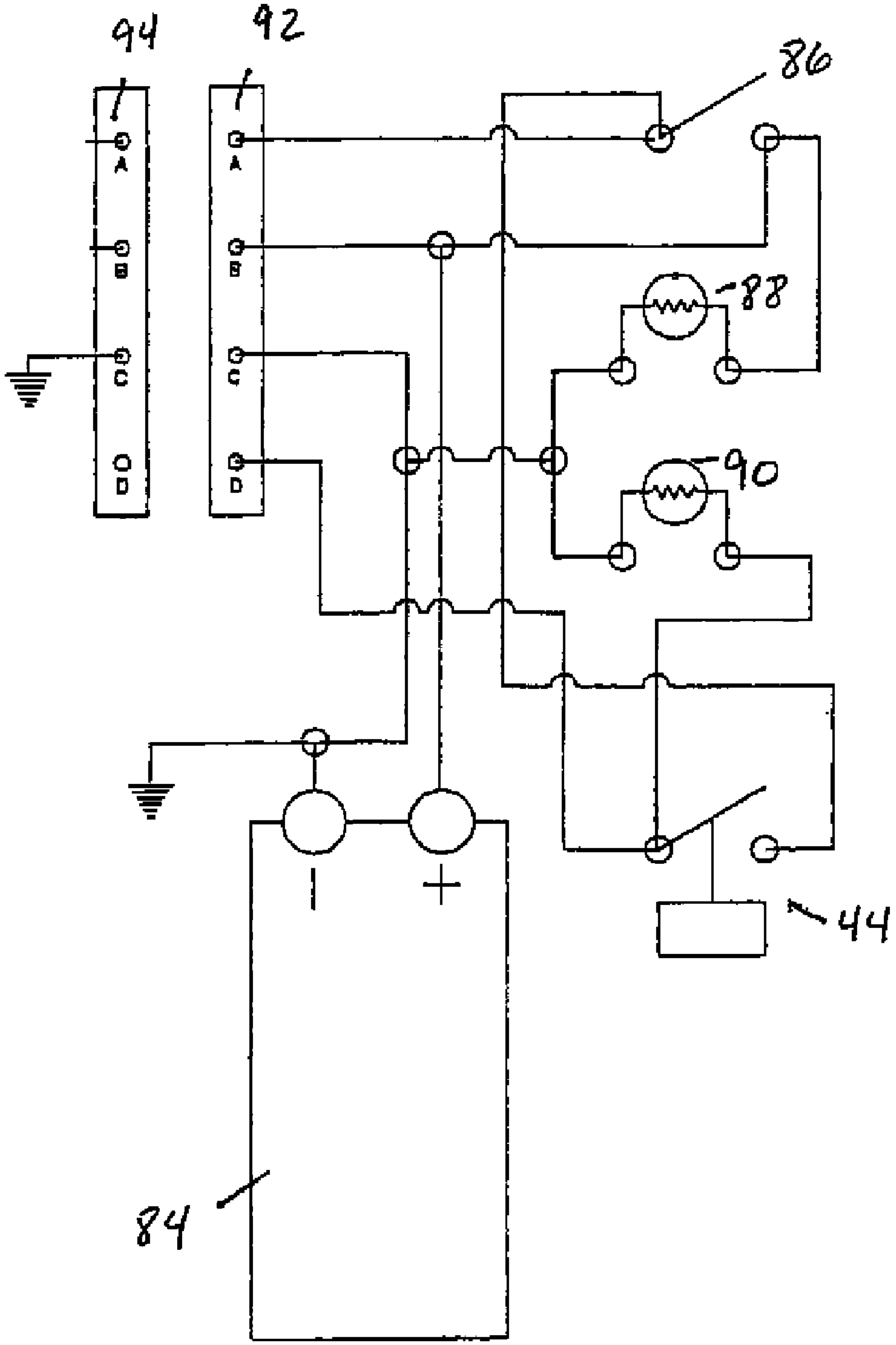
FIG. 3 is an illustration depicting exemplary electrical connections of an exemplary system comprising the multiple filter controller depicted in FIG. 2.

As previously stated, an operator may be alerted to the pressure accumulation in the multiple filter controller by means of a remote annunciator in electrical communication with vacuum switch 44. An exemplary electrical connection between the multiple filter controller and the remote annunciator, wherein the remote annunciator provides visual signals in the form of, for example, a green light when the system if functioning properly and, for example, a yellow light for when the system is not functioning property, is depicted in FIG. 3. Here, vacuum switch 44 of the multiple filter controller is in electrical communication with a fuel pump 84, wherein fuel pump 84 is of the conventional type typically found in-line with, e.g., a diesel fuel filter system. Additionally, a switch 86, a green light lamp 88, a yellow light lamp 90, a first connector 92, and a second connector 94 are further electrically connected to vacuum switch 44 and to fuel pump 84. When the accumulated pressure, as measured by the pressure gage (referenced by reference numeral 42 in FIG. 2, is within normal functioning limits, green light lamp 88 transmits an electric signal to first and second connectors 92 and 94. Connectors 92 and 94 display the green light at a remote location, such as, for example, on the steering panel of a boat. When the accumulated pressure, however, reaches a predetermined amount indicative of a malfunction by one of the filters, green light lamp 88 is deactivated, and yellow light lamp 90 is activated, thereby sending an electric signal to first and second connectors 92 and 94 to display the yellow light at the remote location.

Figure 4:
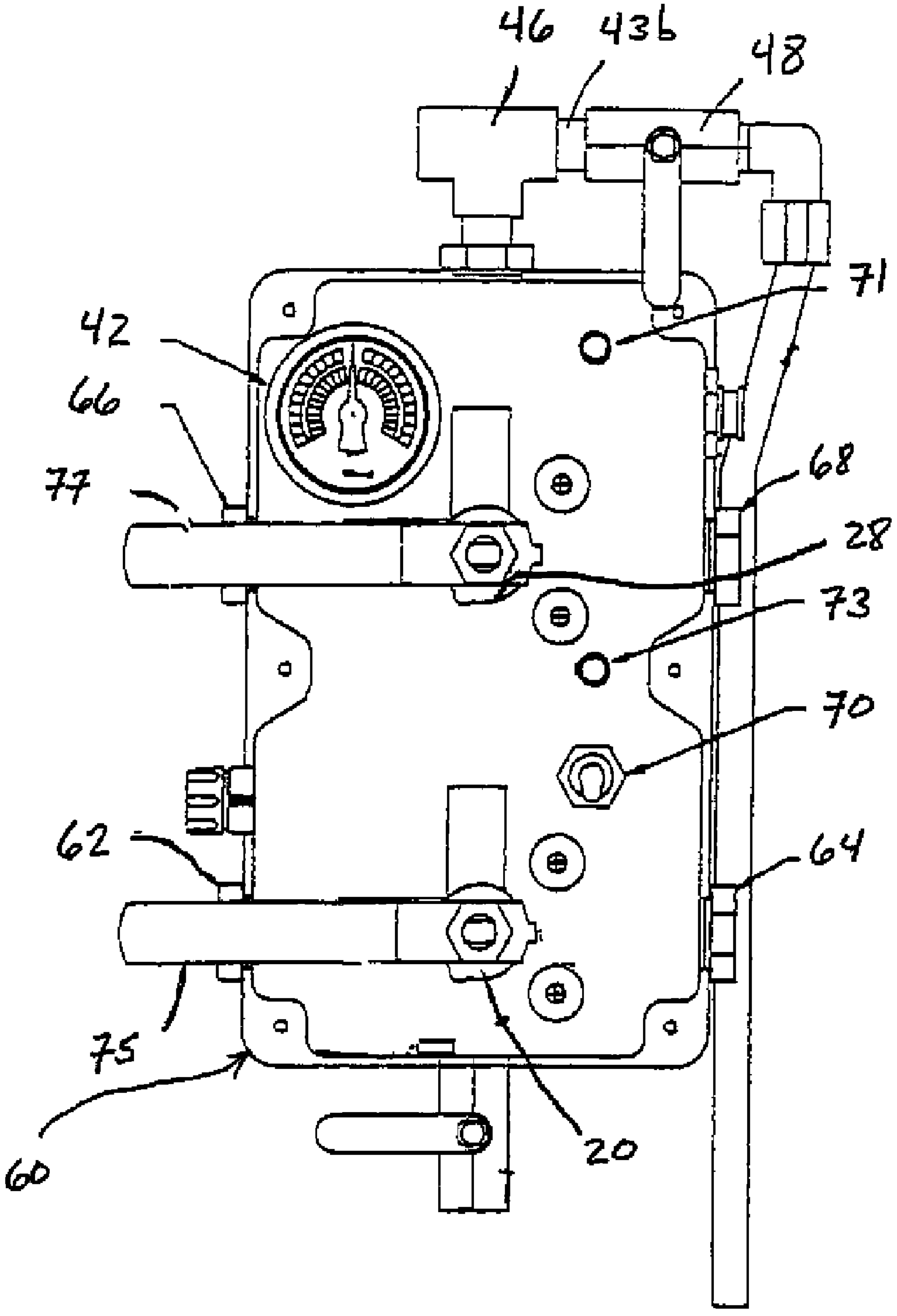
FIG. 4 is an illustration depicting the multiple filter controller also shown in FIG. 2.

An exemplary housing for multiple filter controller is depicted in FIG. 4. Here, a housing 60 comprises an inlet 62 for filter 12 as shown in FIG. 2 and an inlet 64 for filter 16 as shown in FIG. 2. Housing 60 further comprises an outlet 66 for filter 12 and an outlet 68 for filter 16. Housing 60 further comprises a filter inlet selector 75, which controls the positioning of inlet valve 20, a filter outlet selector 77, which controls the positioning of outlet valve 28 and pressure gage 42 as shown in FIG. 2. Bleed valve 48 is attached to conduit 43*b*. Housing 60 further comprises an on/off switch 70 which can activate/deactivate boost pump 36 (not shown). Housing 60 also comprises annunciators comprising a check filter indicator 71 and an indicator that boost pump 36 (not shown) is on/off 73.

Figure 5:
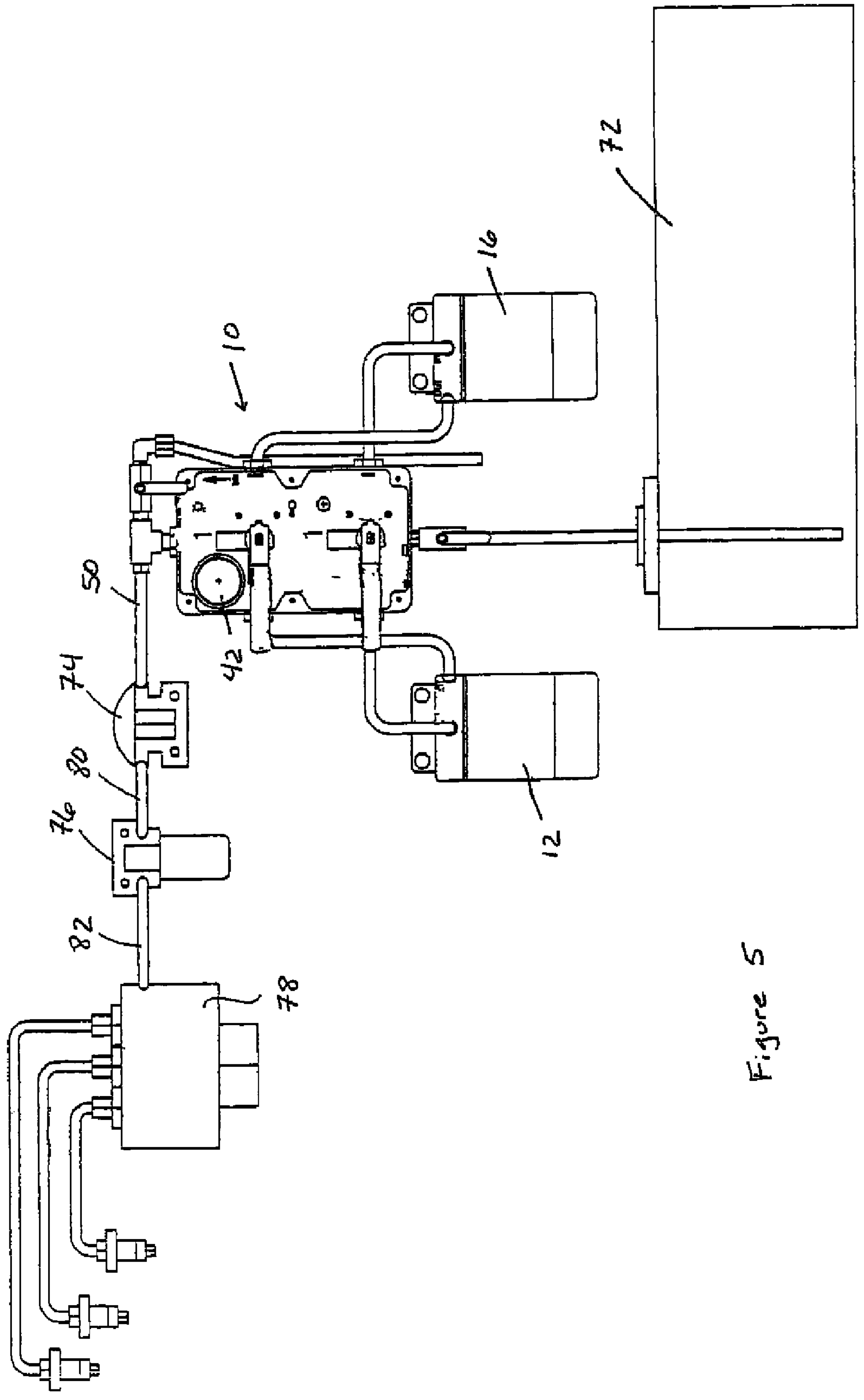
FIG. 5 is an illustration depicting an exemplary fuel system comprising an exemplary multiple filter controller.

An exemplary application of the multiple filter controller as disclosed herein is depicted in FIG. 5. FIG. 5 depicts an exemplary fuel system comprising multiple filter controller 10 in-line downstream from a fuel tank 72, and in-line upstream from a fuel pump 74, a secondary filter 76, and an injector pump 78. In this embodiment, fuel pump 74 pumps fuel from fuel tank 72, such that the fuel enters at least one of filters 12 and 16. The fuel then enters the remainder of multiple filter controller 10 as disclosed above, exits multiple filter controller 10 through outlet 50, and proceeds to flow through fuel pump 74, secondary filter 76, and fuel injector pump 78 via respective conduits 80 and 82.

Although FIG. 5 depicts a fuel tank 72, depending on the use of the multiple filter controller, fuel tank 72 may instead comprise, for example, an engine oil sump, transmission sump, or other source of fluid used with an internal combustion engine. Similarly, fuel pump 74 may be an oil pump, transmission fluid pump, or other pump associated with an engine or vehicle system, the system being the receiver of the conditioned fluid.

In an exemplary application of fuel system 20, valves 20 and 28 are positioned to allow the fuel to pass through filter 12. Fuel pump 74 suctions the fuel from fuel tank 72 through filter 12, whereby filter 12 serves to eliminate or greatly reduce the passing of contaminants from fuel tank 72 into injector pump 78. Additionally, boost pump 36 in multiple filter controller 10 may be used to further pump the fuel through filter 12. Should filter 12 become ineffective in controlling the level of contaminants that pass through fuel system 70, pressure from fuel pump 74 and/or from boost pump 36 builds up within multiple filter controller 10. Once the pressure exceeds a preset amount, an operator is notified to switch from filter 12 to filter 16, or multiple filter controller 10 can automatically switch filters. An operator can read the pressure from pressure gage 42. Filter 16 can replace filter 12 simply by adjusting the position of valves 20 and 28 such that the fuel now enters and exits filter 16. While filter 16 is operating, an operator can replace filter 12, or can repair filter 12 in-line. Additionally, multiple filter controller can be bled via bleed valve 48 while fuel system 70 is still in operation. Additionally, boost pump 36 can assist in the bleeding of multiple filter controller 10.

Multiple filter controller 10 is particularly advantageous over other filter devices currently in existence, in that it allows a faulty filter to be replaced or repaired without the need to turn off the engine. An exemplary method for changing filter 12 utilizing multiple filter controller 10 comprises turning boost pump 36 on such that any air contained in, e.g., conduits 14, 22, 30, 34, 39, and 41 can be released by means of bleed valve 48. Inlet valve 20 and outlet valve 28 are positioned to redirect the passage of fluid from filter 12 to filter 16. Once the fluid has moved through the system such that any excess air contained in multiple filter controller 10 has been released, boost pump 36 may be turned off, wherein the fluid can then move through the multiple filter controller to outlet 50 via check valve 38. Boost pump 36, then, allows for a sanitary method of removing the faulty filter.

Where multiple filter controller 10 does not comprise boost pump 36, the fluid can still be pumped through multiple filter controller 10 by means of a pump either upstream or downstream of device 10. Additionally, multiple filter controller 10 can still be bled by means of bleed valve 48. However, the use of a boost pump 36 enhances the efficiency of bleeding. Valve 28 also assists in the sanitary and safe removal of the faulty filter, in that it reduces the amount of fluid remaining in the filter's respective conduits such that when the filter is removed, less fluid spills out of the multiple filter controller. That is, the faulty filter may be removed with the engine running without gross leakage, loss of fluid priming in the engine system, or ingestion of air into the engine system.

Additionally, the applications of the multiple filter controller as disclosed herein are varied, and include any system wherein back-up filters are desired. Such systems may comprise for example, trailers, campers, and marine engine systems.

The benefits of the multiple filter controller as disclosed herein are many. For example, the multiple filter controller provides a reliable back-up support for a system dependent upon the use of a filter. Additionally, the multiple filter controller can continue operating the system while an operator replaces or fixes a faulty filter. Also, the multiple filter controller provides a simplified means whereby multiple filters can be attached to an outlet conduit. The multiple filter controller further comprises a mechanism whereby the device can be bled during operation of the system. Accordingly, a faulty filter can be repaired or removed without undue leakage of fluid.

It is further intended that any other embodiments of the present invention that result from any changes in application or method of use or operation, method of manufacture, shape, size, or fluid which are not specified within the detailed written description or illustrations contained herein, yet are considered apparent or obvious to one skilled in the art, are within the scope of the present invention.

What is claimed is:

1. A method for maintaining an efficiently working fuel system through the use of a multiple filter controller, said method comprising:

providing a first filter and a second filter;

passing a fuel source through at least one of the first filter and the second filter, comprising providing a boost pump, wherein the boost pump pumps the fuel source through the first filter and the second filter;

detecting when either of the first filter and the second filter are malfunctioning comprising detecting when the level of pressure generated by the malfunctioning filter has reached a predetermined level, wherein such detecting comprises providing a vacuum switch located downstream of the boost pump;

redirecting the fuel source from the malfunctioning filter to the other of said filters when the predetermined level of pressure has been detected by the vacuum switch, wherein redirecting comprises:

manipulating an inlet valve located upstream of the malfunctioning filter and of the other said filters such that the inlet valve stops the flow of the fluid to the malfunctioning filter and redirects the flow of the fluid to the other of said filters; and manipulating an outlet valve located downstream of the malfunctioning filter and of the other of said filters and upstream from the vacuum switch, and wherein manipulating the outlet valve prevents the fuel source from the malfunctioning filter from flowing downstream of the outlet valve and allows the fuel source from the other of said filters to flow downstream of the outlet valve;

repairing or removing the malfunctioning filter from the fuel system while the fuel source is simultaneously flowing through the other of said filters;

bleeding the multiple filter controller of excess air while repairing or removing the first filter, wherein bleeding comprises:

providing a bleed valve positioned downstream from the vacuum switch; and utilizing the boost pump in conjunction with the bleed valve, wherein the boost pump is positioned upstream from the bleed valve and downstream from the outlet valve; and preventing the fuel source from backflowing into the boost pump, wherein preventing the fuel source from backflowing into the boost pump comprises providing a check valve in operable communication with the boost pump and located upstream from the vacuum switch.

2. The method of claim 1, wherein the check valve is serially connected to the boost pump.

3. The method of claim 2, further comprising announcing when the predetermined level of pressure has been reached.

4. The method of claim 3, wherein announcing when the predetermined level of pressure has been reached comprises providing an annunciator in communication with the vacuum switch, wherein the annunciator comprises at least one of an auditory signal, a visual signal, and a vibrational signal.

5. The method of claim 1, further comprising monitoring a level of pressure as the fuel source passes through either of the first filter and the second filter, wherein monitoring comprises providing a pressure gage physically connected to a conduit to which the vacuum switch is also physically connected.

* * * * *